(12) United States Patent
Tanabe et al.

(10) Patent No.: US 12,550,803 B2
(45) Date of Patent: Feb. 17, 2026

(54) WORK MACHINE

(71) Applicant: HONDA MOTOR CO., LTD., Tokyo (JP)

(72) Inventors: Shota Tanabe, Saitama (JP); Nobuo Yamazaki, Saitama (JP); Jun Fukano, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 903 days.

(21) Appl. No.: 17/437,207

(22) PCT Filed: Feb. 18, 2020

(86) PCT No.: PCT/JP2020/006316
§ 371 (c)(1),
(2) Date: Sep. 8, 2021

(87) PCT Pub. No.: WO2020/202855
PCT Pub. Date: Oct. 8, 2020

(65) Prior Publication Data
US 2022/0167544 A1   Jun. 2, 2022

(30) Foreign Application Priority Data
Mar. 29, 2019   (JP) .................................. 2019-068614

(51) Int. Cl.
*A01B 69/04*   (2006.01)
*A01D 34/64*   (2006.01)
(Continued)

(52) U.S. Cl.
CPC ............ *A01B 69/008* (2013.01); *A01D 34/64* (2013.01); *B62D 11/003* (2013.01); *B62D 11/02* (2013.01); *A01D 2101/00* (2013.01)

(58) Field of Classification Search
CPC .. A01B 69/008; A01D 34/64; A01D 2101/00; A01D 34/008; B62D 11/003; B62D 11/02; B62D 11/04
See application file for complete search history.

(56) References Cited

U.S. PATENT DOCUMENTS 4,133,404 A * 1/1979 Griffin ..................... B62D 1/28
                                                                  250/202
4,738,084 A * 4/1988 Ogano ................. A01D 34/824
                                                                 56/DIG. 18
(Continued)

FOREIGN PATENT DOCUMENTS

EP       1847897 A2   10/2007
EP       1943894 A2    7/2008
(Continued)

OTHER PUBLICATIONS

Apr. 13, 2022, European Search Report issued for related EP Application No. 20782292.5.
(Continued)

*Primary Examiner* — Abby J Flynn
*Assistant Examiner* — Matthew John Moscola
(74) *Attorney, Agent, or Firm* — Paratus Law Group, PLLC

(57) ABSTRACT

A work machine includes: a pair of drive wheels that is either front wheels or rear wheels; a pair of non-driving wheels that is the other of the front wheels and the rear wheels; a work device disposed between the front wheels and the rear wheels; a machine body; and a control device including an automatic turn-execution unit configured to execute an automatic turn in a U shape. The automatic-turn execution unit is configured to execute: a gentle turn operation in which the work machine makes a gentle turn; and a (Continued)

counter-rotation turn operation in which the work machine makes a counter-rotation turn after the gentle turn operation.

13 Claims, 8 Drawing Sheets

(51) Int. Cl.
    *A01D 101/00*     (2006.01)
    *B62D 11/00*     (2006.01)
    *B62D 11/02*     (2006.01)

(56) References Cited

U.S. PATENT DOCUMENTS

| | | | | |
|---|---|---|---|---|
| 6,026,634 | A * | 2/2000 | Peter | A01D 34/6806 |
| | | | | 56/14.7 |
| 6,454,032 | B1 * | 9/2002 | Teal | B62D 63/00 |
| | | | | 180/6.62 |
| 11,372,420 | B2 * | 6/2022 | Strandberg | A01D 69/02 |
| 2003/0080704 | A1 * | 5/2003 | Wakitani | B60K 26/02 |
| | | | | 318/432 |
| 2005/0230158 | A1 * | 10/2005 | Kanke | B62D 11/003 |
| | | | | 180/6.5 |
| 2007/0255470 | A1 | 11/2007 | Diekhans et al. | |
| 2009/0000839 | A1 | 1/2009 | Ishii et al. | |
| 2012/0095636 | A1 | 4/2012 | Ishii et al. | |
| 2012/0159916 | A1 | 6/2012 | Ishii et al. | |
| 2012/0238403 | A1 | 9/2012 | Koike et al. | |
| 2012/0253625 | A1 * | 10/2012 | Canuto | B60T 11/21 |
| | | | | 701/72 |
| 2013/0018527 | A1 * | 1/2013 | Bernini | G05D 1/0265 |
| | | | | 701/2 |
| 2013/0205736 | A1 * | 8/2013 | Maruyama | B60L 15/2036 |
| | | | | 56/12.9 |
| 2013/0282214 | A1 * | 10/2013 | Goebel | B62D 11/003 |
| | | | | 701/42 |
| 2014/0059989 | A1 | 3/2014 | Ishii et al. | |
| 2016/0029555 | A1 | 2/2016 | Ishii et al. | |
| 2016/0231749 | A1 * | 8/2016 | Shimamura | G05D 1/0219 |
| 2016/0368496 | A1 * | 12/2016 | Honda | B60K 23/0808 |
| 2017/0285652 | A1 * | 10/2017 | Shimamura | B60L 50/60 |
| 2018/0054963 | A1 * | 3/2018 | Lydon | A01D 34/008 |
| 2018/0093708 | A1 * | 4/2018 | Soldan | A01B 69/007 |
| 2018/0210440 | A1 * | 7/2018 | Matsuzaki | G05D 1/0027 |
| 2018/0303027 | A1 * | 10/2018 | Koike | B60L 50/51 |
| 2018/0317368 | A1 * | 11/2018 | Du | A01D 34/008 |
| 2018/0338417 | A1 * | 11/2018 | Matsuda | A01D 34/006 |
| 2019/0233033 | A1 * | 8/2019 | Harnetiaux | B62D 11/003 |
| 2019/0291779 | A1 * | 9/2019 | Zeiler | H01Q 1/27 |
| 2019/0350130 | A1 * | 11/2019 | Spitz | B60W 50/14 |
| 2020/0088270 | A1 * | 3/2020 | Spitz | F16H 7/1281 |
| 2021/0169000 | A1 * | 6/2021 | Yamagishi | A01D 69/02 |

FOREIGN PATENT DOCUMENTS

| | | |
|---|---|---|
| JP | H06-141614 A | 5/1994 |
| JP | H10-024859 A | 1/1998 |
| JP | 2002-308137 A | 10/2002 |
| JP | 2008-168870 A | 7/2008 |
| JP | 2015-188441 A | 11/2015 |

OTHER PUBLICATIONS

Apr. 7, 2020, International Search Report issued for related PCT application No. PCT/JP2020/006316.
Apr. 7, 2020, International Search Opinion issued for related PCT application No. PCT/JP2020/006316.
Jan. 13, 2023, European Communication issued for related EP Application No. 20782292.5.

* cited by examiner

WORK MACHINE

CROSS REFERENCE TO PRIOR APPLICATION

This application is a National Stage Patent Application of PCT International Patent Application No. PCT/JP2020/006316 (filed on Feb. 18, 2020) under 35 U.S.C. § 371, which claims priority to Japanese Patent Application No. 2019-068614 (filed on Mar. 29, 2019), which are all hereby incorporated by reference in their entirety.

TECHNICAL FIELD

The present disclosure relates to a work machine.

BACKGROUND ART

As a lawn mower in a related art, there has been known a so-called riding-type lawn mower operated by a driver to mow a lawn including: front wheels, rear wheels; a lawn-mowing device disposed between the front wheels and the rear wheels; and a machine body on which an occupant rides (for example, see Patent Literature 1).

In lawn mowing by a lawn mower, reciprocating mowing in which U-turns are repeated as shown in FIG. 8 is performed, and peripheral mowing around the periphery is performed finally. Patent Literature 1 discloses that, during a U-turn, the lawn mower moves backward once after making a gentle turn and then makes a gentle turn again.

CITATION LIST

Patent Literature

Patent Literature 1: JP2015-188441A

SUMMARY OF INVENTION

Technical Problem

However, with the lawn mower of Patent Literature 1, it takes time to move backward once during the U-turn, and besides, the ride is uncomfortable. Although it is possible to make a U-turn by moving forward once after making a counter-rotation turn without moving backward and then making a counter-rotation turn again, it takes time to make two counter-rotation turns, and besides, the ride is uncomfortable. Moreover, although it is possible to make a U-turn by making a sharp turn for shorter time, a lawn may be peeled off in that case. These problems may occur not only with the lawn mower but also with other work machines.

An object of the present disclosure is to provide a work machine that can prevent a lawn from being peeled off and the ride from being uncomfortable.

Solution to Problem

The present disclosure provides a work machine including: front wheels; rear wheels; a work device disposed between the front wheels and the rear wheels; a machine body; and a control device including an automatic turn execution unit configured to execute an automatic turn in a U shape, in which the automatic turn execution unit executes: a gentle turn operation in which the work machine makes a gentle turn; and a counter-rotation turn operation in which the work machine makes a counter-rotation turn after the gentle turn operation.

Advantageous Effects of Invention

According to the present disclosure, it is possible to prevent a lawn from being peeled off and the ride from being uncomfortable by executing the counter-rotation turn operation in which the work machine makes a counter-rotation turn after the gentle turn operation.

DESCRIPTION OF EMBODIMENTS

Figure 1:
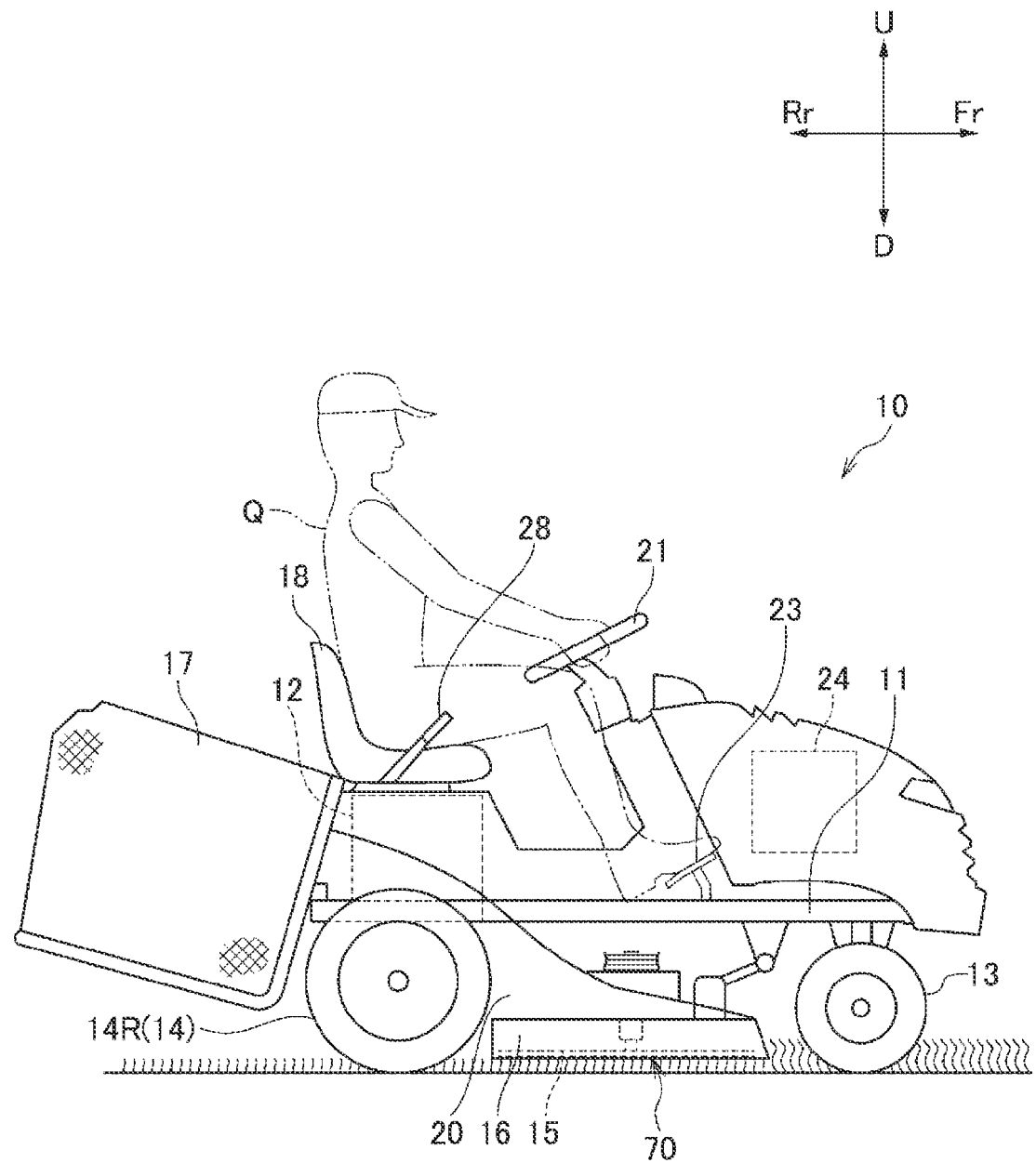
FIG. 1 is a side view of a lawn mower according to an embodiment of the present disclosure.
Figure 2:
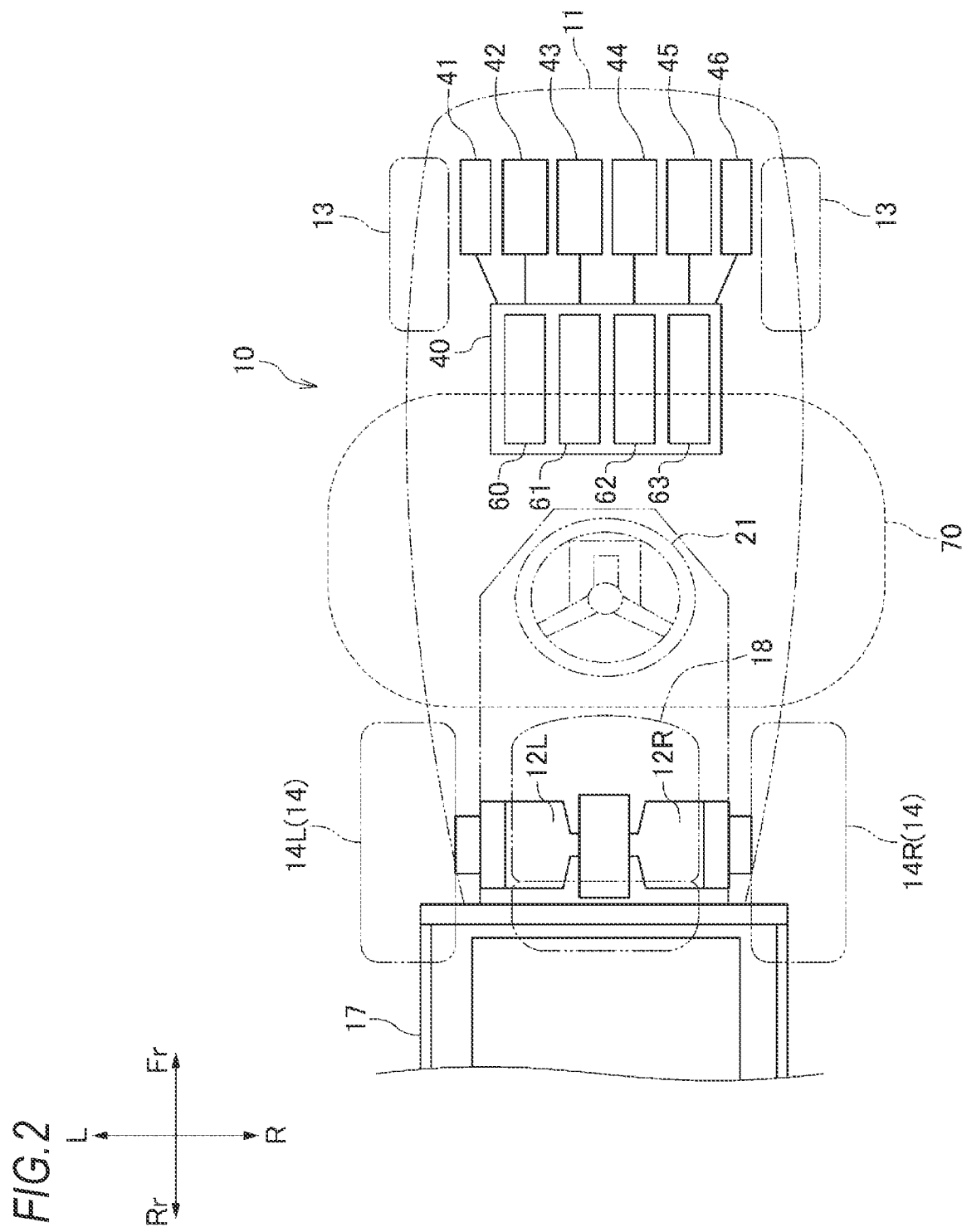
FIG. 2 is a plan view of the lawn mower of FIG. 1.

Hereinafter, a lawn mower according to an embodiment of a work machine of the present disclosure will be described with reference to the drawings. In the following, the forward direction of a lawn mower 10 is referred to as the front, the backward direction as the rear, and a direction perpendicular to the front-rear direction is referred to as the left-right direction. In FIGS. 1 and 2, Fr denotes the front side of the lawn mower 10, Rr the rear side, U the upper side, D the lower side, L the left side, and R the right side.

As shown in FIGS. 1 and 2, the lawn mower 10 includes a machine body 11. The machine body 11 includes: left and right motors 12L and 12R as drive sources; left and right rear wheels 14 (hereinafter, the left rear wheel may be referred to as 14L, and the right rear wheel as 14R) provided at a rear part of the machine body 11 as drive wheels driven by the left and right motors 12L and 12R; left and right front wheels 13 provided at a front part of the machine body 11 as non-driving wheels; a lawn-mowing device 70 provided at a lower part of the machine body 11; a grass bag 17 located behind the lawn-mowing device 70 to store mowed grass; a seat 18 on which an occupant Q sits; and an engine 24 configured to drive the lawn-mowing device 70. The lawn-mowing device 70 includes: three rotary blades 15 (see FIG. 6) rotated by power of the engine 24; and a rotary blade housing 16 that covers the periphery of the rotary blades 15 and guides the mowed grass rearward. The occupant Q is not limited to sitting on the seat 18 but may ride the machine body 11 in a standing manner.

The lawn mower 10 is also provided with: a grass duct 20 connecting the rotary blade housing 16 and the grass bag 17; a steering wheel 21 to turn the front wheels 13; an accelerator 23 to control throttle; a vehicle-speed control lever 28 to set a vehicle speed; and the like.

As shown in FIG. 2, the motors 12L and 12R are connected to the left rear wheel 14L and the right rear wheel 14R, respectively. Power of the left and right motors 12L and 12R is respectively transmitted to the left rear wheel 14L and the right rear wheel 14R via a reduction drive to drive rotationally the left rear wheel 14L and the right rear wheel 14R, and thereby the machine body 11 travels. At this time, the left and right front wheels 13 rotate following traveling of the machine body 11.

During lawn-mowing traveling, the rotary blades 15 are rotationally driven by the engine 24 as described above. When the rotary blades 15 rotate, grass is cut and swirling air flow is generated in the rotary blade housing 16. Grass cut by the rotary blades 15 is sucked up by the air flow in the rotary blade housing 16 and is gathered into the grass bag 17 through the grass duct 20.

As shown in FIG. 2, the lawnmower 10 includes: a control device 40; a standby input unit 41; a turn input unit 43; a completion input unit 42; a yaw-rate sensor 44; a slip-amount input unit 45; and a motor drive unit 46.

The control device 40 is configured to control components of the lawnmower 10. The control device 40 includes a computer having: a processor 60 such as a CPU and an MPU; a memory device 61 such as a ROM and a RAM; a storage device 62 such as an HDD and an SSD; and an interface circuit 63 for connecting sensors, peripheral devices, and the like. The processor 60 is configured to execute a computer program stored in the memory device 61 or the storage device 62 to implement various functions.

The standby input unit 41 is, for example, a button switch. When the occupant Q performs an input operation immediately before a turn, a speed of the lawn mower 10 is reduced to a first predetermined vehicle speed (low speed) to get the lawn mower 10 into a turn-standby state.

The turn input unit 43 is, for example, a lever. When the occupant Q performs an input operation in an end position of straight-line lawn-mowing, that is, a turn start position, the turn input unit 43 causes the lawn mower 10 to perform an automatic turn. A left turn or a right turn are distinguishably input into the turn input unit 43 before an automatic turn. For example, when the occupant Q tilts the lever to the left side, a left turn instruction is input in which the left rear wheel 14L is an inner wheel and the right rear wheel 14R is an outer wheel, and, when the occupant Q tilts the lever to the right side, a right turn instruction is input in which the right rear wheel 14R is an inner wheel and the left rear wheel 14L is the outer wheel. An automatic turn refers to turning by 180° in a U shape automatically without the occupant Q operating the steering wheel.

The completion input unit 42 is, for example, a button switch. When the occupant Q performs an input operation after an automatic turn is completed, the lawn mower 10 is accelerated from a second predetermined vehicle speed (low speed) to return to an operation state before the turn. The first predetermined vehicle speed, which is the vehicle speed of the lawn mower 10 immediately before an automatic turn, and the second predetermined vehicle speed, which is the vehicle speed of the lawn mower 10 immediately after the automatic turn, may be the same as or different from each other.

The yaw-rate sensor 44 is configured to detect a turning angle of the lawn mower 10. The slip-amount input unit 45 may be provided together with the yaw-rate sensor 44 or instead of the yaw-rate sensor 44. The slip-amount input unit 45 is, for example, a switch, a lever, or the like capable of inputting a slip amount in a stepwise manner. When the occupant Q performs an input operation with the slip-amount input unit 45 immediately before a turn, a forward distance in a forward operation as will be described later is changed. In the present embodiment, the lawn mower 10 provided with the yaw-rate sensor 44 and the slip-amount input unit 45 will be described as an example. Input units such as the standby input unit 41, the turn input unit 43, the completion input unit 42, and the slip-amount input unit 45 may be a touch panel or a voice input system.

The motor drive unit 46 is configured to control the left and right motors 12L and 12R independently and includes an electronic control unit (ECU). The ECU is a circuit unit including the above-described computer. The motor drive unit 46 is configured to determine rotation directions and rotation speeds of the left and right motors 12L and 12R each, which drive the left rear wheel 14L and the right rear wheel 14R, which are drive wheels, based on an instruction from a drive control unit 58 as will be described later.

The control device 40 has various functions for executing an automatic turn by controlling driving of the rear wheels 14 and 14 independently, which are drive wheels, based on input from the standby input unit 41, the turn input unit 43, the completion input unit 42, the yaw-rate sensor 44, and the slip-amount input unit 45.

Figure 3:
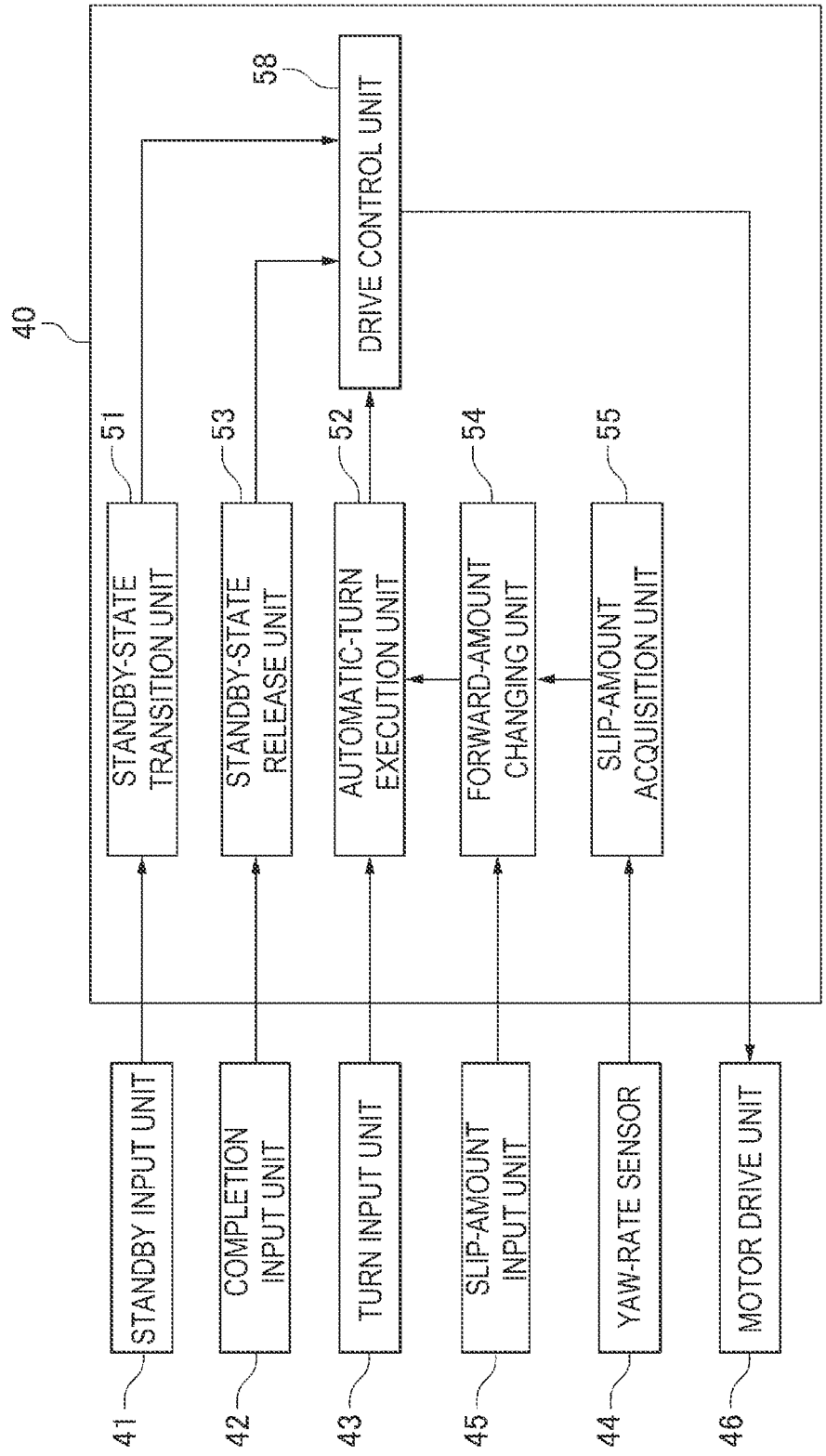
FIG. 3 is a block diagram of a control device of the lawn mower of FIG. 1.

FIG. 3 shows a functional configuration of the control device. As shown in FIG. 3, the control device 40 includes: a standby-state transition unit 51; an automatic-turn execution unit 52; a standby-state release unit 53; a forward-amount changing unit 54; a slip-amount acquisition unit 55; and the drive control unit 58.

When the occupant Q operates the standby input unit 41, the standby-state transition unit 51 decelerates the lawn mower 10 to the first predetermined vehicle speed (low speed), which is a set vehicle speed, to get the lawn mower 10 into an automatic-turn standby state.

The automatic-turn execution unit 52 is configured to execute an automatic turn of the lawn mower 10 based on an operation of the turn input unit 43. The automatic turn will be described in detail later.

Based on an operation to the completion input unit 42 by the occupant Q, the standby-state release unit 53 returns the vehicle speed of the lawn mower 10, which has been reduced, from the second predetermined vehicle speed (vehicle speed) to an original speed before deceleration, and starts straight-line lawn mowing in a next row.

The slip-amount acquisition unit 55 is configured to acquire a slip amount in a gentle turn operation during an automatic turn, which will be described later, based on a detected value of the yaw-rate sensor 44.

The forward-amount changing unit 54 is configured to change the forward distance in the forward operation during an automatic turn as will be described later, based on the slip amount acquired by the slip-amount acquisition unit 55 or input of the slip-amount input unit 45.

Figure 4:
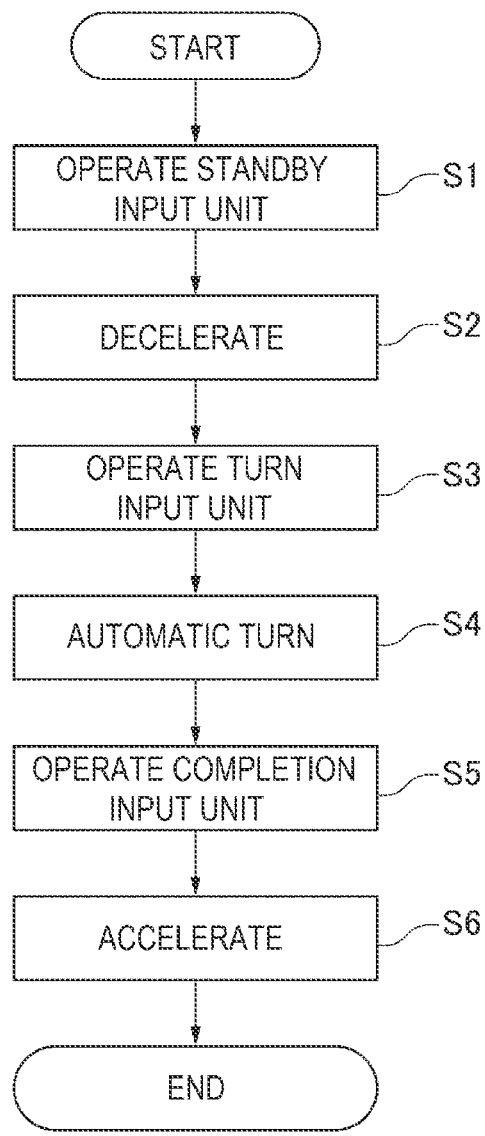
FIG. 4 is a flowchart of an automatic turn operation of the lawn mower.

Next, an automatic turn of the lawn mower 10 according to the present embodiment will be described in detail. FIG. 4 is a flowchart of an automatic turn operation of the lawn mower 10. In the following, a case will be described as an example in which, after straight-line lawn mowing in a first row, the direction is changed to the left side by 180° by an automatic turn, and then straight-line lawn mowing in a second row is performed.

During lawn mowing in the first row, when the lawn mower 10 reaches an end of a straight-line lawn mowing area, that is, the automatic-turn start position and the occupant Q operates the standby input unit 41 (step S1), the standby-state transition unit 51 reduces the vehicle speed of the lawn mower 10 to the first predetermined vehicle speed set to get the lawn mower 10 into an automatic-turn standby state (step S2).

Next, when the turn input unit 43 is operated (step S3), the automatic-turn execution unit 52 executes an automatic turn (step S4). An automatic turn of a first example includes: a gentle turn operation of the lawn mower 10; a forward operation in which the lawn mower 10 travels straight after the gentle turn; and a counter-rotation turn operation in which the inner wheel and the outer wheel are rotated reversely after the forward operation. An automatic turn of a second example includes: a gentle turn operation; and a counter-rotation turn operation in which the inner wheel and the outer wheel are rotated reversely after the gentle turn operation. The gentle turn operation refers to rotating both the inner wheel and the outer wheel in the forward direction as the rotation speed of the outer wheel is higher than that of the inner wheel. On the other hand, a sharp turn operation refers to rotating the outer wheel in the forward direction with the inner wheel stopped. In a counter-rotation turn, the inner wheel and the outer wheel may be rotated reversely at the same rotation speed or at different rotation speeds (irregular counter-rotation turn). In the following, an irregular counter-rotation turn will be described as an example.

Figure 5:
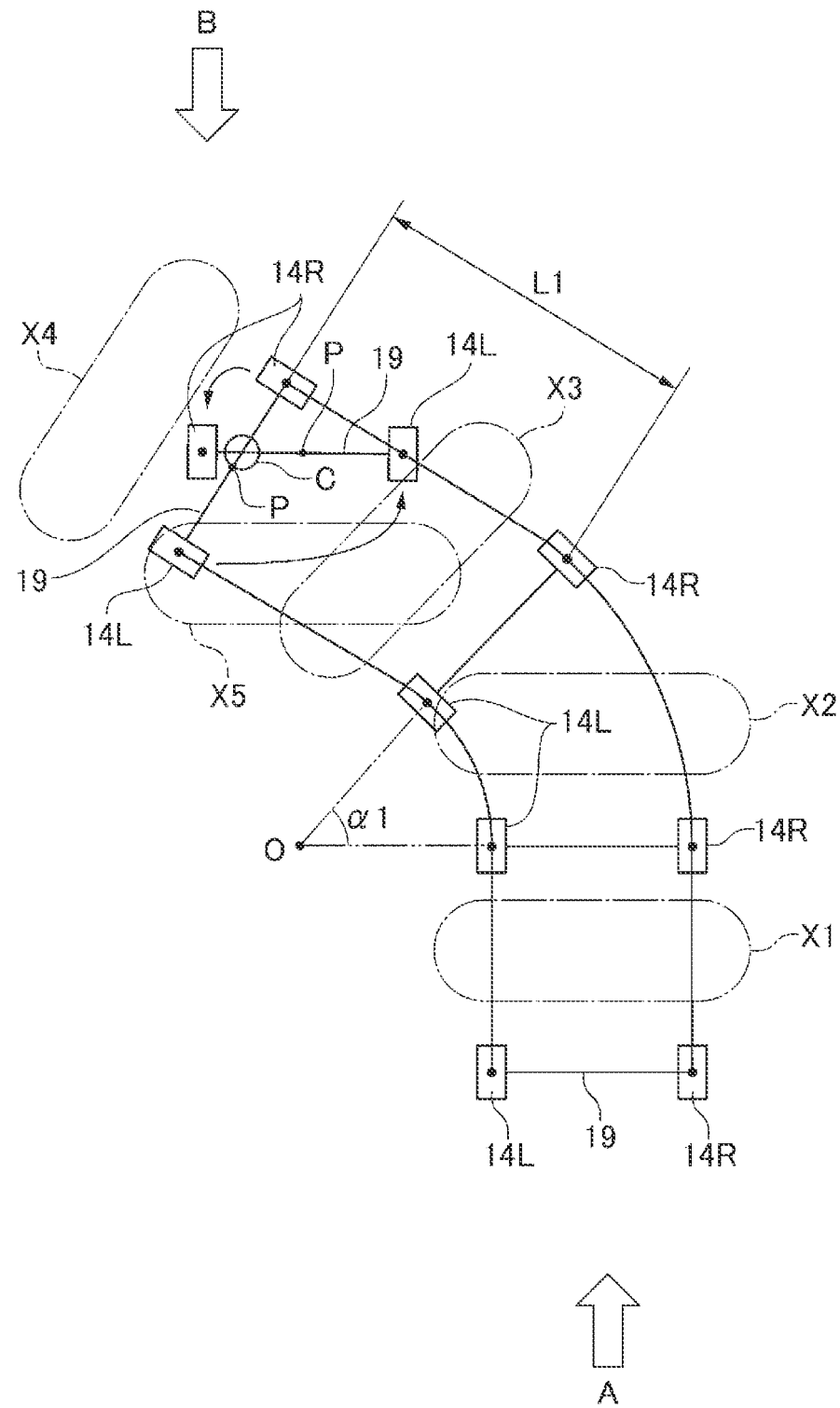
FIG. 5 is a schematic view of an automatic turn of a first example.

First Example: Gentle Turn Operation+Forward Operation+Irregular Counter-Rotation Turn In an automatic turn of the first example, first, as shown in FIG. 5, the lawn mower 10 gently turns to the left side by $\alpha 1°$ ($\alpha 1 \leq 90°$) with a center O located on the left side of the lawn mower 10 a fulcrum in response to an operation of the turn input unit 43. As a result, a mowing range X1 of the three rotary blades 15 immediately before the turn also turns to the left side and moves to mowing ranges X2 and X3 while the lawn mower 10 is mowing a lawn. Then, the lawn mower 10 travels forward straight further in a diagonally leftward direction by a predetermined distance (L1 of FIG. 5). Thereby, the rotary blades 15 move from the mowing range X3 to a mowing range X4.

Although the forward distance L1 is set in advance, the turning angle of the lawn mower 10 may be different from a set one depending on a situation of a lawn surface or the like. At this time, for example, a compensational value of the forward distance is obtained from a table of the correlation between the yaw angle and the forward distance stored in the memory device 61 or the storage device 62 based on an actual yaw angle of the lawn mower 10 detected by the yaw-rate sensor 44, so that the forward-amount changing unit 54 automatically changes the forward distance L1. Instead of an output value of the yaw-rate sensor 44, the straight forward distance L1 may be changed based on input of the slip-amount input unit 45 by the occupant Q. As a result, the forward distance L1 can be changed highly accurately in accordance with a situation of a lawn surface.

Next, the lawn mower 10 rotates the right rear wheel 14R, which is a drive wheel on the outer side, in the forward direction and rotates the left rear wheel 14L, which is a drive wheel on the inner side, in the reverse direction at a speed higher than the right rear wheel 14R simultaneously, thereby performing an irregular counter-rotation turn. Since the left rear wheel 14L is rotated in the reverse direction at a speed higher than the right rear wheel 14R in the irregular counter-rotation turn, the lawn mower 10 turns in the counterclockwise direction around a point C which is near the right rear wheel 14R on an axle 19 of the rear wheels 14.

In case in which a counter-rotation turn is made, in which the left rear wheel 14L and the right rear wheel 14R rotate reversely at the same speed, the lawn mower 10 turns around an axial center P on the axle 19 of the rear wheels 14. The turning direction of the lawn mower 10 depends on rotation directions of the left rear wheel 14L and the right rear wheel 14R. That is, if the right rear wheel 14R is rotated in the forward direction and the left rear wheel 14L is rotated in the reverse direction, the lawn mower 10 turns in the counter-clockwise direction, and, if the right rear wheel 14R is rotated in the reverse direction and the left rear wheel 14L is rotated in the forward direction, the lawn mower 10 turns in the clockwise direction.

In case in which an irregular counter-rotation turn is made, in which the left rear wheel 14L and the right rear wheel 14R rotate reversely at different speeds, the lawn mower 10 turns around the point C on the axle 19 of the rear wheels 14. The turning center point C is located in a position away from the axial center P on the axle 19 of the rear wheels 14 in proportion to a difference in the rotation speeds between the left rear wheel 14L and the right rear wheel 14R. Specifically, if the rotation speed of the left rear wheel 14L is higher than that of the right rear wheel 14R, the turning center point C on the axle 19 is on the right rear wheel 14R side relative to the axial center P of the axle 19, and, if the rotation speed of the right rear wheel 14R is higher than that of the left rear wheel 14L, the turning center point C on the axle 19 is on the left rear wheel 14L side relative to the axial center P of the axle 19.

The lawn mower 10 changes the traveling direction by 180° (direction B) after the automatic turn by the irregular counter-rotation turn. When the irregular counter-rotation turn is completed, the automatic turn is completed with the rotary blades 15 located in a mowing range X5.

Referring back to FIG. 4, when the occupant Q operates the completion input unit 42 after the automatic turn (step S5), the standby-state release unit 53 returns the vehicle speed of the lawn mower 10, which has been reduced, to the original speed before deceleration (step S6), thereby lawn mowing in a next row being possible.

In this way, by adjusting the forward distance L1 of the forward operation, it is possible to adjust a distance between widthwise centers of the left rear wheel 14L, which is an inner wheel, before and after the automatic turn. By adjusting an amount of overlap (lap amount) between the mowing range X1 before the automatic turn and the mowing range X5 after the automatic turn, it is possible to prevent residue from being left between straight-line lawn-mowing parts (the first row and the second row) adjacent before and after the automatic turn.

Figure 6:
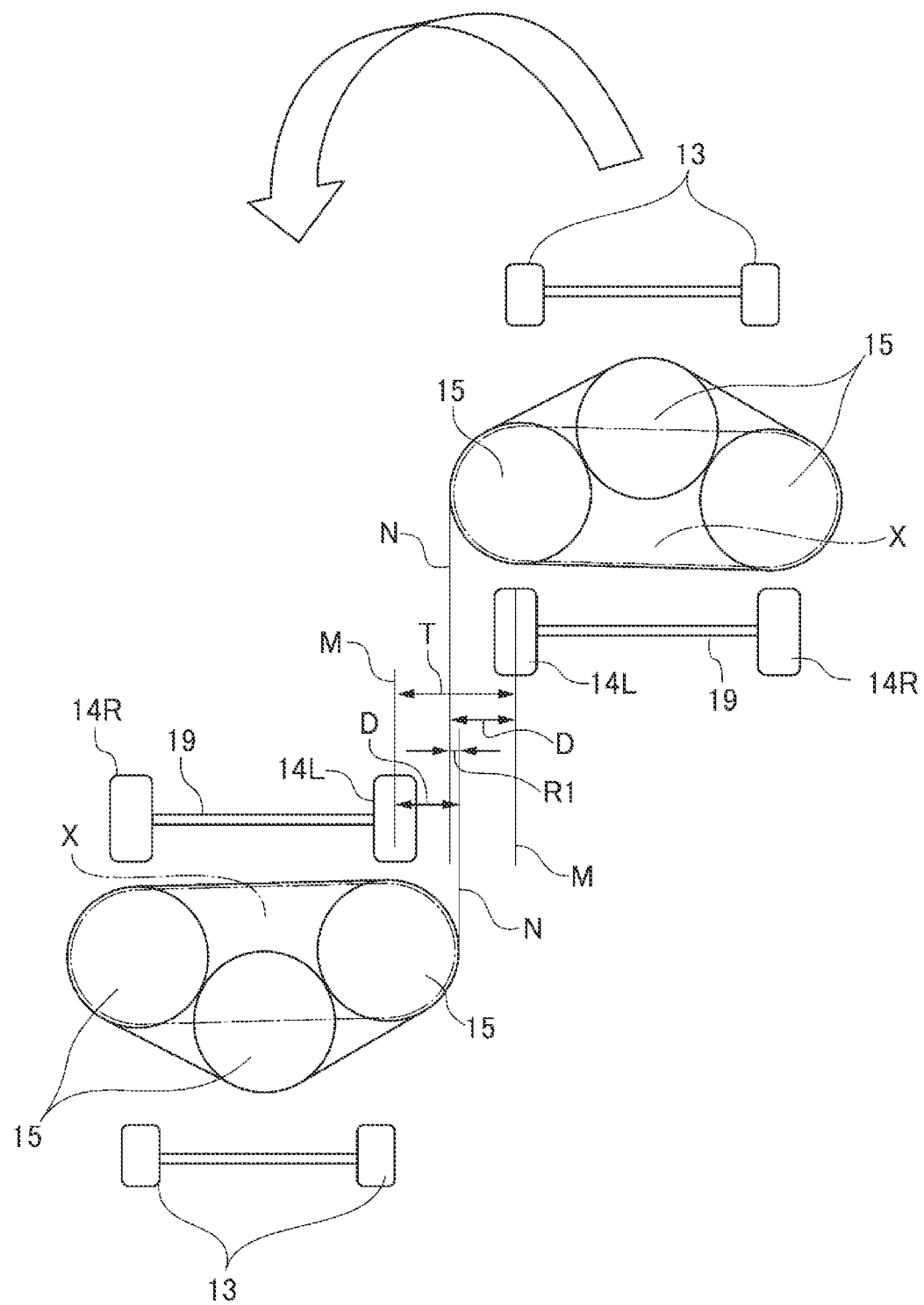
FIG. 6 is a schematic view showing a lap amount in the automatic turn of the first example.

The lap amount of an automatic turn will be described with reference to FIG. 6.

When D denotes the distance between a widthwise center M of the left rear wheel 14L and a widthwise end portion N on the inner side (left rear wheel 14L side) of the lawn-mowing device (three rotary blades 15) before and after the automatic turn, and T denotes the distance between the widthwise centers of the left rear wheel 14L before and after the automatic turn, the automatic-turn execution unit 52 is configured to control the lawn mower 10 to satisfy $T \leq 2D$. In other words, the automatic-turn execution unit 52 controls the lawn mower 10 to satisfy a lap amount $R1 (=2D-T) \geq 0$. In the first example, the lap amount is controlled by changing the forward distance L1 of the forward operation performed before the irregular counter-rotation turn operation by the forward-amount changing unit 54.

The automatic turn-execution unit 52 controls the lawn mower 10 to satisfy $T \leq 2D$, that is, as for a mowing area X of the lawn mower 10, the mowing range X1 before the automatic turn and the mowing range X5 after the automatic turn overlap. Thus, it is possible to prevent residue from being left between adjacent straight lawn-mowing lines.

In this way, by the automatic turn with the counter-rotation turn after the gentle turn operation, it is possible to prevent grass from being peeled off due to a sharp turn and residue from being left during an automatic turn. Moreover, since it is not necessary to perform a backward movement and two counter-rotation turns, it is possible to prevent the ride from being uncomfortable.

Further, by performing the forward operation after the gentle turn operation and before the counter-rotation turn operation, it is possible to adjust the path during the automatic turn highly accurately. In response to inputs from the standby input unit 41, the turn input unit 43, and the completion input unit 42, the lawn mower 10 gets into the automatic-turn standby state to perform an automatic turn and then returns from the automatic-turn standby state. Thus, it is possible to prevent the occupant from feeling a surprise and the ride from being uncomfortable.

Furthermore, in an irregular counter-rotation turn operation, by setting the rotation speed of the right rear wheel 14R on the inner side higher than that of the left rear wheel 14L on the outer side, the lawn mower 10 after the counter-rotation turn can be disposed on the rear side, so that it is possible to prevent residue from being left further.

Second Example: Gentle Turn Operation+Irregular Counter-Rotation Turn

Figure 7:
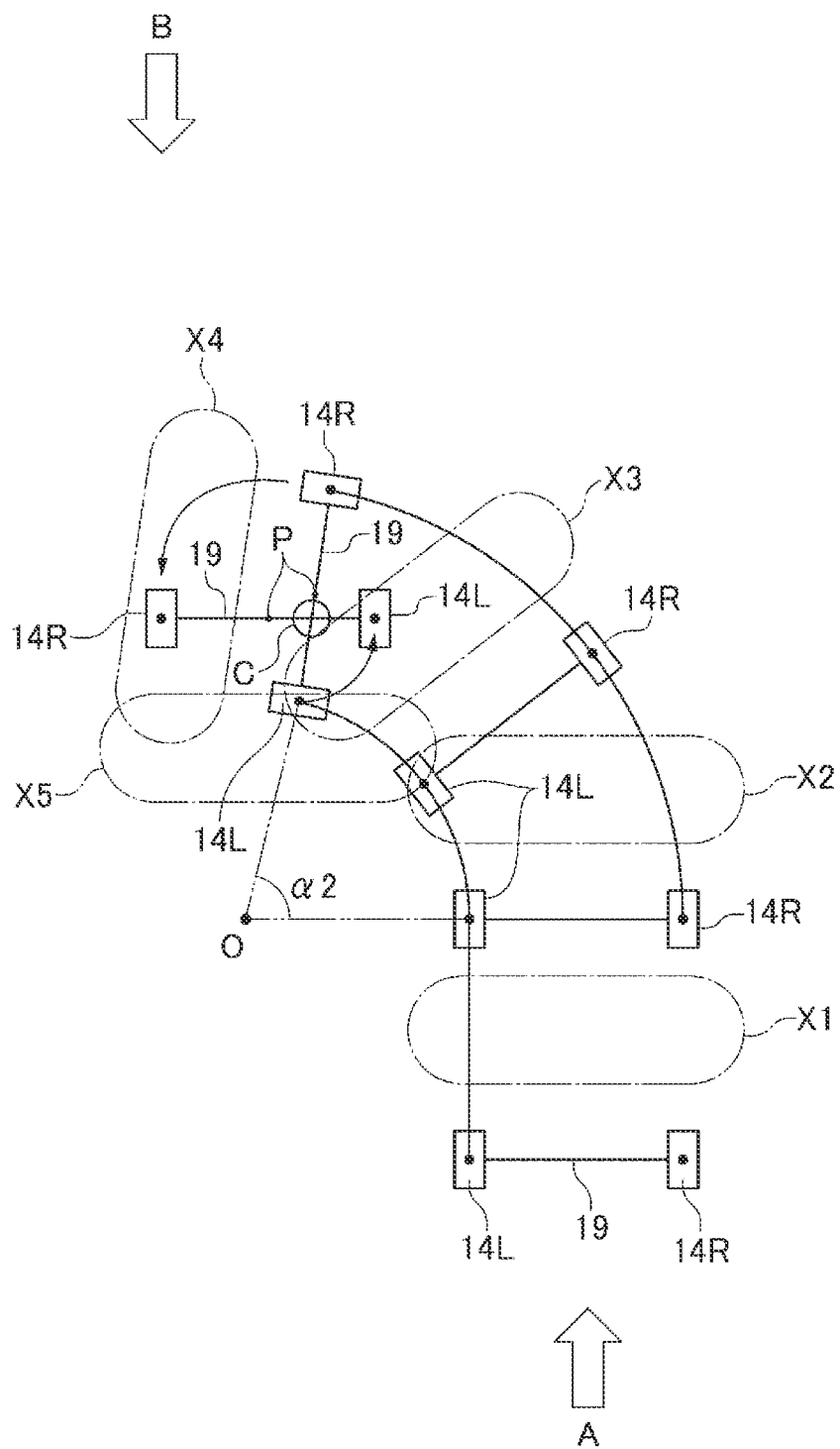
FIG. 7 is a schematic view of an automatic turn of a second example.
Figure 8:
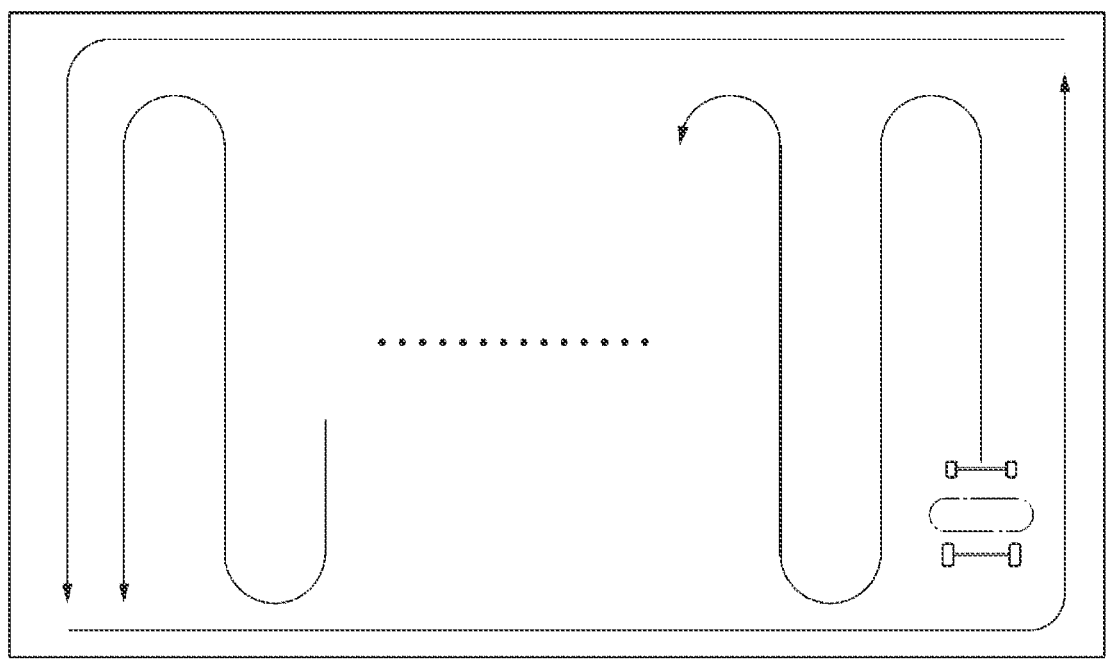
FIG. 8 is a schematic view showing a general lawn-mowing method by a lawn mower.

In an automatic turn of the second example, first, as shown in FIG. 7, the lawn mower 10 gently turns to the left side by $\alpha 2°$ ($\alpha 1 < \alpha 2 \leq 90°$) with a center O located on the left side of the lawn mower 10 a fulcrum in response to an operation of the turn input unit 43 in an automatic-turn start position. As a result, a mowing range X1 of the three rotary blades 15 immediately before the turn also turns to the left side by 90° and moves to mowing ranges X2, X3, and X4 while the lawn mower 10 is mowing a lawn.

Next, the lawn mower 10 rotates the right rear wheel 14R, which is a drive wheel on the outer side, in the forward direction and rotates the left rear wheel 14L, which is a drive wheel on the inner side, in the reverse direction at a speed lower than the right rear wheel 14R simultaneously, thereby performing an irregular counter-rotation turn. Since the right rear wheel 14R is rotated in the reverse direction at a speed higher than the left rear wheel 14L in the irregular counter-rotation turn, the lawn mower 10 turns in the counterclockwise direction around a point which is near the left rear wheel 14L on the axle 19 of the rear wheels 14.

The lawn mower 10 changes the traveling direction by 180° (direction B) after the automatic turn by the irregular counter-rotation turn. When the irregular counter-rotation turn is completed, the automatic turn is completed with the rotary blades 15 located in a mowing range X5.

In the second example, although the distance T between the widthwise centers of the left rear wheel 14L before and after the automatic turn cannot be adjusted by adjusting the forward distance L1 since a forward operation is not performed, the distance T between the widthwise centers of the left rear wheel 14L before and after the automatic turn can be adjusted by adjusting rotation speeds of the left rear wheel 14L and the right rear wheel 14R in the irregular counter-rotation turn. Since the amount of overlap (lap amount) of the mowing range X1 before the automatic turn and the mowing range X5 after the automatic turn is the same as that in the first example, the description thereof will be omitted.

In this way, by the automatic turn with the counter-rotation turn after the gentle turn operation, it is also possible, in the second example, to prevent grass from being peeled off and the ride from being uncomfortable.

The embodiments described above can be appropriately modified or improved. For example, although the rear wheels 14 are drive wheels and the front wheels 13 are non-driving wheels in the description, the front wheels 13 may be drive wheels and the rear wheels 14 non-driving wheels.

Although the riding-type lawn mower is taken as an example of a work machine in the embodiments described above, the work machine may be a lawn mower that can be remotely operated by a remote-control operation or the like or that can autonomously travel with a program. in addition, the work machine is not limited to a lawn mower but may be another work machine such as a tractor.

The present specification describes at least the following matters. Although corresponding components or the like in the above embodiment are shown in parentheses, the present disclosure is not limited thereto.

(1) A work machine (lawn mower 10) includes:
   a pair of drive wheels (rear wheels 14) that is either front wheels (front wheels 13) or rear wheels (rear wheels 14):
   a pair of non-driving wheels (front wheels 13) that is the other of the front wheels and the rear wheels;
   a work device (lawn-mowing device 70) disposed between the front wheels and the rear wheels;
   a machine body (machine body 11); and
   a control device (control device 40) including an automatic-turn execution unit (automatic-turn execution unit 52) configured to execute an automatic turn in a U shape, in which the automatic turn execution unit is configured to execute:
   a gentle turn operation in which the work machine makes a gentle turn and
   a counter-rotation turn operation in which the work machine makes a counter-rotation turn after the gentle turn operation.

According to (1), by executing the counter-rotation turn operation, in which the work machine makes a counter-rotation turn after the gentle turn operation, it is possible to prevent grass from being peeled off and the ride from being uncomfortable. That is, compared with a case in which the work machine makes a sharp turn, it is possible to prevent grass from being peeled off due to a sharp turn. Since it is not necessary to perform a backward movement or two counter-rotation turns, it is possible to prevent the ride from being uncomfortable.

(2) The work machine according to (1), in which,
   in the counter-rotation turn operation, the automatic-turn execution unit makes, of the pair of drive wheels, a rotation speed of a drive wheel (left rear wheel 14L) on an inner side different from a rotation speed of a drive wheel (right rear wheel 14R) on an outer side.

According to (2), by changing the rotation speed of the drive wheel on the inner side and that of the drive wheel on the outer side in the counter-rotation turn operation, a position of the work machine after the counter-rotation turn can be adjusted.

(3) The work machine according to (2), in which
   the automatic-turn execution unit is configured to set the rotation speed of the drive wheel on the inner side higher than that of the drive wheel on the outer side.

According to (3), by setting the rotation speed of the drive wheel on the inner side higher than that of the drive wheel on the outer wheel side in the counter-rotation turn operation, the work machine after the counter-rotation turn can be positioned on the rear side.

(4) The work machine according to any one of (1) to (3), in which
the control device further includes a standby-state transition unit (standby-state transition unit 51) configured to get the work machine into an automatic-turn standby state in response to input from a standby input unit (standby input unit 41), and
the automatic-turn execution unit executes the automatic turn in response to input from a turn input unit (turn input unit 43) in the automatic-turn standby state.

According to (4), the automatic turn can be prepared by getting to the automatic-turn standby state in response to the input from the standby input unit. In addition, by executing the automatic turn in response to the input from the turn input unit, it is possible to prevent the occupant from feeling a surprise and the ride from being uncomfortable.

(5) The work machine according to (4), in which,
in the automatic-turn standby state, the standby-state transition unit controls the work machine so that a speed of the work machine is equal to or lower than a first predetermined speed.

According to (5), by controlling the work machine so that the speed of the work machine is equal to or lower than the first predetermined speed in the automatic-turn standby state, it is possible to prevent the ride from being uncomfortable during the automatic turn. In addition, it is possible to prevent the rotation radius from increasing.

(6) The work machine according to any one of (1) to (5), in which,
after the automatic turn, the automatic-turn execution unit controls the work machine so that a speed of the work machine is equal to or lower than a second predetermined speed, and
the automatic-turn execution unit is configured to permit the speed of the work machine to be larger than the second predetermined speed in response to input from a completion input unit (completion input unit 42).

According to (6), by permitting the speed of the work machine to be larger than the second predetermined speed in response to the input from the completion input unit, it is possible to prevent the ride from being uncomfortable at the end of the automatic turn.

(7) The work machine according to any one of (1) to (6), in which,
after the gentle turn operation and before the counter-rotation turn operation, the automatic-turn execution unit executes a forward operation in which the work machine moves forward.

According to (7), by executing the forward operation, in which the work machine moves forward, after the gentle turn operation and before the counter-rotation turn operation, it is possible to adjust the path during the automatic turn more accurately.

(8) The work machine according to (7), in which,
when D denotes a distance between a widthwise center of a drive wheel on an inner side of the pair of drive wheels and a widthwise end portion on the inner side of the work device before and after the automatic turn, and T denotes a distance between widthwise centers of the drive wheel on the inner wheel side before and after the automatic turn, the automatic turn execution unit is configured to control the work machine to satisfy $T \leq 2D$.

According to (8), the automatic-turn execution unit controls the work machine to satisfy $T \leq 2D$, so that it is possible to overlap the work device before and after the automatic turn.

(9) The work machine according to (8) further includes a yaw-rate sensor (yaw-rate sensor 44), in which
the control device further includes a slip-amount acquisition unit (slip-amount acquisition unit 55) configured to acquire a slip amount in the gentle turn operation based on an output value of the yaw-rate sensor.

According to (9), the slip amount is acquired by integrating the tuning angle using the yaw-rate sensor, so that the slip amount can be acquired more accurately compared with a case in which the slip amount is acquired only by the turning angle of the wheels.

(10) The work machine according to (9), in which
the control device further includes a forward-amount changing unit (forward-amount changing unit 54) configured to change a forward distance of the forward operation based on the slip amount.

According to (10), the forward distance of the forward operation can be changed based on the slip amount.

(11) The work machine according to (7), in which
the control device further includes a forward-amount changing unit (forward-amount changing unit 54) configured to change a forward distance of the forward operation according to input from a slip-amount input unit (slip amount-input unit 45).

According to (11), it is possible to change the forward distance of the forward operation by operation of the user with the manufacturing cost prevented from increasing.

REFERENCE SIGNS LIST 10 lawn mower (work machine)
11 machine body
13 front wheels (driven wheels)
14 rear wheels (drive wheels)
14L left rear wheel (drive wheel on inner side)
14R right rear wheel (drive wheel on outer side)
41 standby input unit
42 completion input unit
43 turn input unit
44 yaw-rate sensor
45 slip-amount input unit
51 standby state transition unit
52 automatic-turn execution unit
54 forward amount changing unit
55 slip-amount acquisition unit
70 lawn-mowing device (work device)
Q occupant

The invention claimed is:
1. A work machine comprising:
a pair of left and right drive wheels that is either front wheels or rear wheels;
a pair of non-driving wheels that is an other of the front wheels and the rear wheels;
a work device disposed between the front wheels and the rear wheels;
a machine body; and
a control device configured to execute an automatic turn in a U shape,
wherein the automatic turn includes:
a first operation in which the work machine makes a turn by rotating both an inner wheel and an outer wheel, which are the pair of left and right wheels, in a forward direction of the work machine as a rotation speed of the outer wheel is higher than a rotation speed of the inner wheel;

a second operation in which the work machine makes a forward operation in response to the first operation turning the work machine by a predetermined turning angle; and a third operation in which the work machine makes a counter-rotation turn in which the inner wheel is rotated in a reverse direction and the outer wheel is rotated in the forward direction different from the reverse direction, the third operation being performed in response to the second operation moving the work machine forward by a predetermined distance.

2. The work machine according to claim 1, wherein, in the third operation, the control device makes, of the pair of left and right drive wheels, the rotation speed of the inner wheel different from the rotation speed of the outer wheel.

3. The work machine according to claim 2, wherein In the third operation, the control device is configured to set the rotation speed of the inner wheel higher than that of the outer wheel.

4. The work machine according to claim 1, wherein the control device is configured to get the work machine into an automatic-turn standby state in response to an operation by an operator of the work machine, and the control device executes the automatic turn in response to an operation by the operator in the automatic-turn standby state.

5. The work machine according to claim 4, wherein, in the automatic-turn standby state, the control device controls the work machine so that a vehicle speed of the work machine is equal to or lower than a first predetermined speed.

6. The work machine according to claim 1, wherein, after the automatic turn, the control device controls the work machine so that a vehicle speed of the work machine is equal to or lower than a second predetermined speed, and the control device is configured to permit the vehicle speed of the work machine to be larger than the second predetermined speed in response to an operation of an operator of the work machine.

7. The work machine according to claim 1, wherein, after the first operation and before the third operation, the control device executes the second operation.

8. The work machine according to claim 7, wherein, when D denotes a distance between a widthwise center of the inner wheel and a widthwise end portion on an inner side of the work device before and after the automatic turn, and T denotes a distance between widthwise centers of the inner wheel before and after the automatic turn, the control device is configured to control the work machine to satisfy $T \leq 2D$.

9. The work machine according to claim 8, further comprising a yaw-rate sensor, wherein the control device is configured to acquire a slip amount in the first operation based on an output value of the yaw-rate sensor.

10. The work machine according to claim 9, wherein the control device is configured to change a forward distance of the forward operation based on the slip amount.

11. The work machine according to claim 7, wherein the control device is configured to change a forward distance of the forward operation according to an operation of an operator of the work machine.

12. The work machine according to claim 1, wherein the work machine makes the forward operation in a straight line in the second operation.

13. The work machine according to claim 1, wherein the work machine makes the forward operation in the second operation by rotating both the inner wheel and the outer wheel in the forward direction at a same speed.

* * * * *